No. 725,546. PATENTED APR. 14, 1903.
J. D. DE CELLE.
DEHORNING KNIFE.
APPLICATION FILED AUG. 9, 1902.
NO MODEL.
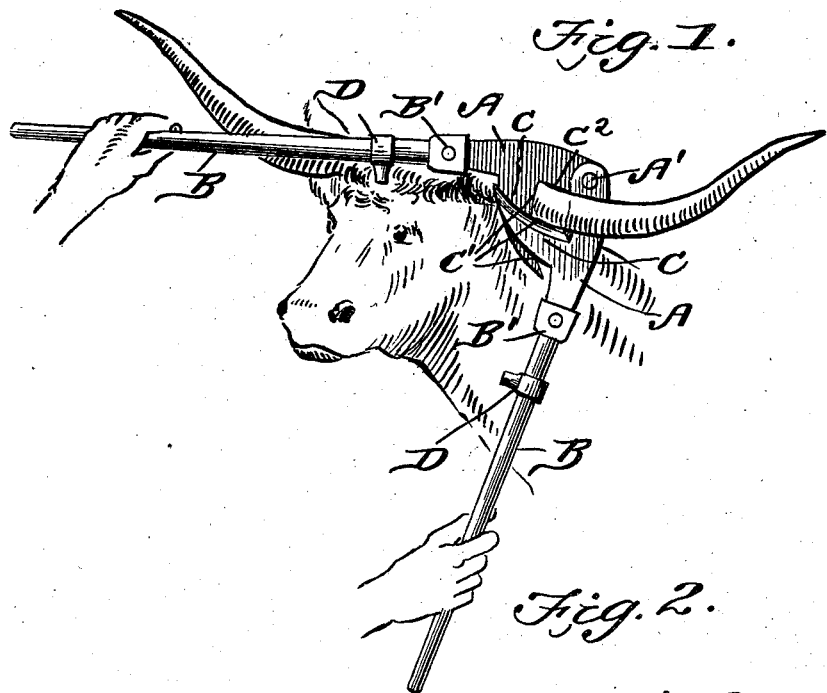
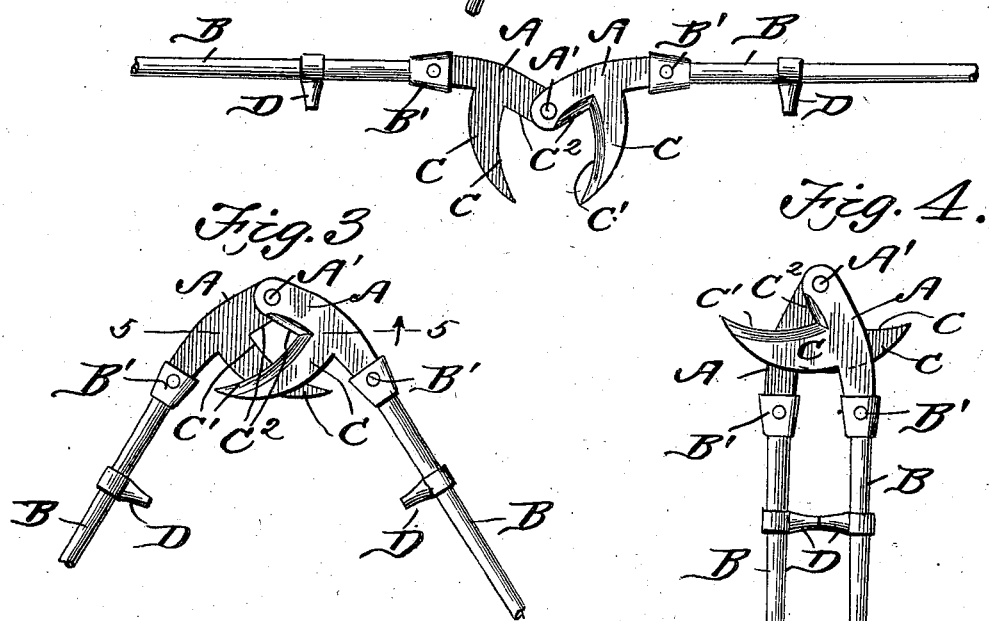
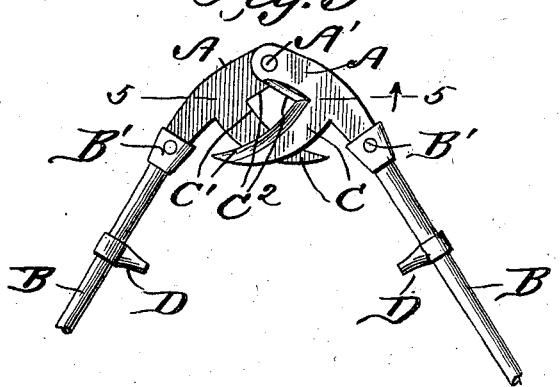
Inventor
Jerry D. DeCelle.

UNITED STATES PATENT OFFICE.

JERRY D. DE CELLE, OF FORT COLLINS, COLORADO.

DEHORNING-KNIFE.

SPECIFICATION forming part of Letters Patent No. 725,546, dated April 14, 1903.

Application filed August 9, 1902. Serial No. 119,064. (No model.)

*To all whom it may concern:*

Be it known that I, JERRY D. DE CELLE, a citizen of the United States, residing at Fort Collins, in the county of Larimer and State of Colorado, have invented a new and useful Improvement in Dehorning-Knives, of which the following is a specification.

This invention is an improved construction of dehorning-tool, the object being to provide a cheap and simple device which will be highly efficient in operation owing to the powerful leverage and the peculiar construction and operation of the cutting-blade.

With this object in view the invention consists, essentially, in the employment of two curved arms pivoted together and provided with operating-handles, each curved arm carrying a curved cutting-blade, the contiguous portions of the arms being constructed with cutting edges, so that when the arms and blades are brought together four cutting edges will be made to approach one another, thus quickly and easily cutting the horn.

The invention consists also in certain details of construction and novelties of combination, all of which will be fully described hereinafter and pointed out in the claims.

In the drawings forming part of this specification, Figure 1 is a perspective view illustrating the practical application of my invention. Fig. 2 is a side elevation of the tool, the blades being opened. Fig. 3 is a similar view, the blades being partially closed; Fig. 4 is a view showing the blades completely closed, and Fig. 5 is a section on the line 5 5 of Fig. 3.

In carrying out my invention I employ two curved arms or jaws A, which are pivotally connected to each other at A' and are connected to the operating-handles B at B'. Each arm or jaw A has an integral curved blade C, the inner edge C' being sharpened to produce a cutting edge, and the contiguous edge of the arm or jaw A is also sharpened, as shown at $C^2$. It will thus be seen that two cutting-blades arranged at an angle to each other are arranged upon opposite sides of the pivot-point, and inasmuch as the blades and jaws work past each other, as shown most clearly in Figs. 3 and 5, it is obvious that any object, such as a horn, placed between the blades will be severed as the operating-handles are brought toward each other, and it will be noted by reference to Fig. 3 that when the blades are brought into operative position a diamond-shaped opening is produced, which opening is gradually decreased on all four sides as the cutting operation continues, thus producing a gradual cut from four different directions. Suitable stops D are arranged upon each handle to limit the movement of the said handle and prevent any wrenching operation at the completion of the stroke.

It will thus be seen that I provide an exceedingly simple and easily-operated dehorning tool or knife, and its advantages will be apparent to everyone skilled in the art to which it relates.

Having thus fully described my invention, what I claim as new, and desire to secure by Letters Patent, is—

1. A dehorning device comprising two handles each carrying a bifurcated blade, the said blades being pivoted together at the end of the shorter bifurcated members, the longer bifurcated members being adapted to pass each other.

2. In a dehorning-knife, the combination with the handles, of curved arms secured to said handles said arms being pivoted at their outer ends and having cutting edges formed thereon adjacent the pivotal point, and forwardly-curved arms, their inner edges forming cutting-blades, extending from the first-named arms at a point intermediate the handles and the pivotal point.

JERRY D. DE CELLE.

Witnesses:
FRANK J. ANNIS,
FRED W. STOW.